(12) United States Patent
Raschilla et al.

(10) Patent No.: US 12,187,145 B2
(45) Date of Patent: Jan. 7, 2025

(54) ELECTRIC VEHICLE SUPPLY EQUIPMENT POWER SUPPLY CORD

(71) Applicant: Aptiv Technologies AG, Schaffhausen (CH)

(72) Inventors: Anthony C. Raschilla, Girard, OH (US); Mark A Plant, Boardman, OH (US); Jacob Friedrich, Willoughby, OH (US); Steve Marzo, Cortland, OH (US); Don Bizon, Youngstown, OH (US)

(73) Assignee: Aptiv Technologies AG, Schaffhausen (CH)

( * ) Notice: Subject to any disclaimer, the term of this patent is extended or adjusted under 35 U.S.C. 154(b) by 526 days.

(21) Appl. No.: 17/587,308

(22) Filed: Jan. 28, 2022

(65) Prior Publication Data

US 2023/0099692 A1    Mar. 30, 2023

Related U.S. Application Data

(60) Provisional application No. 63/247,933, filed on Sep. 24, 2021.

(51) Int. Cl.
| | |
|---|---|
| *B60L 53/18* | (2019.01) |
| *B60L 53/16* | (2019.01) |
| *H01R 13/66* | (2006.01) |
| *H01R 24/30* | (2011.01) |

(52) U.S. Cl.
CPC ............. *B60L 53/18* (2019.02); *B60L 53/16* (2019.02); *H01R 13/665* (2013.01); *H01R 24/30* (2013.01); *H01R 2201/26* (2013.01)

(58) Field of Classification Search
USPC ........................................................ 320/109
See application file for complete search history.

(56) References Cited

U.S. PATENT DOCUMENTS

| | | | |
|---|---|---|---|
| 9,487,099 B2 | 11/2016 | Muller et al. | |
| 9,634,435 B1 | 4/2017 | Raschilla et al. | |
| 2005/0221674 A1* | 10/2005 | Ching | H01R 13/6608 439/620.21 |
| 2014/0235101 A1* | 8/2014 | Derbogen | H01R 13/658 29/876 |
| 2019/0375299 A1 | 12/2019 | Penney | |
| 2020/0217722 A1 | 7/2020 | Borin | |

* cited by examiner

*Primary Examiner* — Bryce M Aisaka
(74) *Attorney, Agent, or Firm* — Billion & Armitage (57) ABSTRACT

An electrical power supply cord includes a wire cable comprising a plurality of separate conductors, a plurality of plug terminals connected to the plurality of separate conductors, a molded inner plug encasing a connection between the plurality of plug terminals and the plurality of separate conductors, and an in-mold bonding adhesive disposed intermediate the connection between the plurality of plug terminals and the plurality of separate conductors and the molded inner plug.

18 Claims, 7 Drawing Sheets

ELECTRIC VEHICLE SUPPLY EQUIPMENT POWER SUPPLY CORD

CROSS-REFERENCE TO RELATED APPLICATION

This application claims benefit of priority to U.S. Application No. 63/247,933 filed on Sep. 24, 2021, the entire disclosure of which is hereby incorporated by reference.

TECHNICAL FIELD

This disclosure is directed to an electrical power supply cord for electric vehicle supply equipment (EVSE), i.e., a portable electric charger interface for an electrical vehicle.

BACKGROUND

Figure 1:
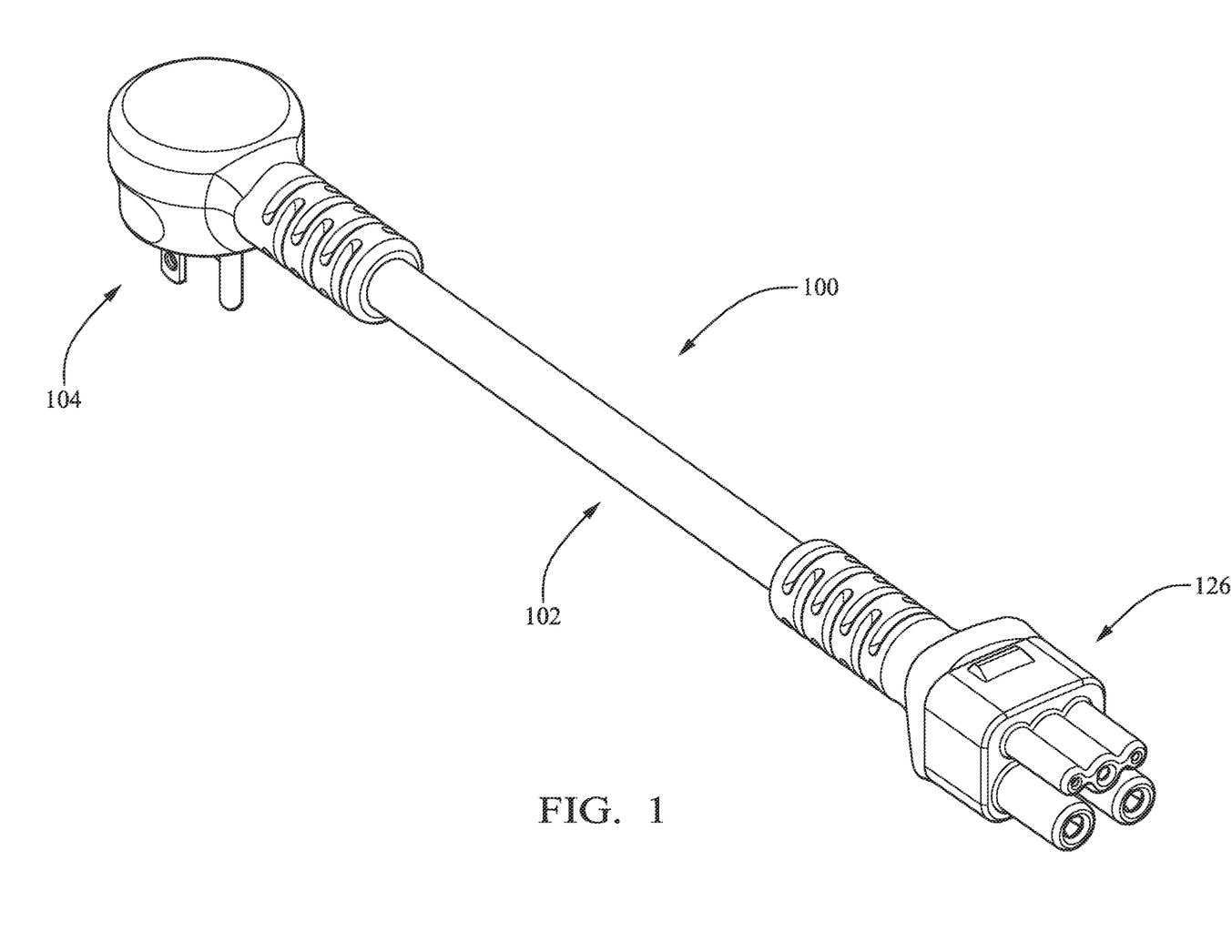
FIG. 1 shows a perspective view of an EVSE power supply cord according to some embodiments.

Electric vehicle supply equipment is a portable charging cord set that supplies alternating current (AC) electrical power to on-board battery chargers present in electric vehicles (EVs) or plug-in hybrid electric vehicles (PHEVs). There are many portable charging cord sets available for consumers to purchase and use with their EVs or PHEVs. A typical EVSE power supply cord used in North America and illustrated in FIG. 1 provides a line operating voltage of 120 volts AC (VAC) to the vehicle and conforms with the National Electrical Manufacturers Association (NEMA) 5-15 standard which is hard-wired to the EVSE. A line voltage of 120 VAC typicality takes 8-10 hours to completely charge the vehicle's battery pack. Some electric vehicle manufacturers have a provision to swap the 120V EVSE power supply cord with a 240 VAC EVSE power supply cord conforming with the NEMA 14-50 standard. The 240 VAC option can reduce the overall battery charging time by 25% to 50%.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY

According to one or more aspects of the present disclosure, an electrical power supply cord includes a wire cable comprising a plurality of separate conductors, a plurality of plug terminals connected to the plurality of separate conductors, a molded inner plug encasing a connection between the plurality of plug terminals and the plurality of separate conductors, and in-mold bonding adhesive disposed intermediate the connection between the plurality of plug terminals and the plurality of separate conductors and the molded inner plug.

In one or more embodiments of the electrical power supply cord according to the previous paragraph, the molded inner plug is formed of an injection moldable polymer.

In one or more embodiments of the electrical power supply cord according to any one of the previous paragraphs, the molded inner plug is formed of polybutylene terephthalate.

In one or more embodiments of the electrical power supply cord according to any one of the previous paragraphs, the electrical power supply cord further includes a molded outer plug encasing the molded inner plug and a portion of the wire cable.

In one or more embodiments of the electrical power supply cord according to any one of the previous paragraphs, the molded outer plug is formed of a thermoplastic elastomer.

In one or more embodiments of the electrical power supply cord according to any one of the previous paragraphs, the molded outer plug is shaped to provide strain relief between the molded inner plug and the wire cable.

In one or more embodiments of the electrical power supply cord according to any one of the previous paragraphs, the electrical power supply cord further includes a plurality of socket terminals connected to the plurality of separate conductors, a molded inner socket encasing a connection between the plurality of socket terminals and the plurality of separate conductors, a molded outer socket encasing the molded inner socket and a portion of the wire cable, and in-mold bonding adhesive disposed intermediate the molded inner socket and the molded outer socket.

In one or more embodiments of the electrical power supply cord according to any one of the previous paragraphs, the molded inner socket is formed of an injection moldable polymer.

In one or more embodiments of the electrical power supply cord according to any one of the previous paragraphs, the molded inner socket is formed of polybutylene terephthalate.

In one or more embodiments of the electrical power supply cord according to any one of the previous paragraphs, the molded outer socket is formed of a thermoplastic elastomer.

In one or more embodiments of the electrical power supply cord according to any one of the previous paragraphs, the molded outer socket is shaped to provide strain relief between the molded inner socket and the wire cable.

According to one or more aspects of the present disclosure, a method of assembling a electrical power supply cord includes connecting a plurality of plug terminals, a plurality of separate conductors in a wire cable, depositing an in-mold bonding adhesive on the plurality of plug terminals and the plurality of separate conductors, and forming a molded inner plug encasing a connection between the plurality of plug terminals and the plurality of separate conductors using an injection molding process.

In one or more embodiments of the method according to the previous paragraph, the molded inner plug is formed of polybutylene terephthalate.

In one or more embodiments of the method according to any one of the previous paragraphs, the method further includes forming a molded outer plug encasing the molded inner plug and a portion of the wire cable using an injection molding process.

In one or more embodiments of the method according to any one of the previous paragraphs, the molded outer plug is formed of a thermoplastic elastomer.

In one or more embodiments of the method according to any one of the previous paragraphs, the method further includes shaping the molded outer plug to provide strain relief between the molded inner plug and the wire cable.

In one or more embodiments of the method according to any one of the previous paragraphs, the method further includes connecting a plurality of socket terminals to the plurality of separate conductors, forming a molded inner socket encasing a connection between the plurality of socket terminals and the plurality of separate conductors using an injection molding process, deposing the in-mold bonding adhesive on the molded inner socket, and forming a molded outer socket encasing the molded inner socket and a portion of the wire cable using an injection molding process, such that the in-mold bonding adhesive is deposited intermediate the molded inner socket and the molded outer socket.

In one or more embodiments of the method according to any one of the previous paragraphs, the molded inner socket is formed of polybutylene terephthalate.

In one or more embodiments of the method according to any one of the previous paragraphs, the molded outer socket is formed of a thermoplastic elastomer.

In one or more embodiments of the method according to any one of the previous paragraphs, the method further includes shaping the molded outer socket to provide strain relief between the molded inner socket and the wire cable.

DESCRIPTION OF THE DRAWINGS

The present invention will now be described, by way of example with reference to the accompanying drawings, in which.

DETAILED DESCRIPTION

Figure 2:
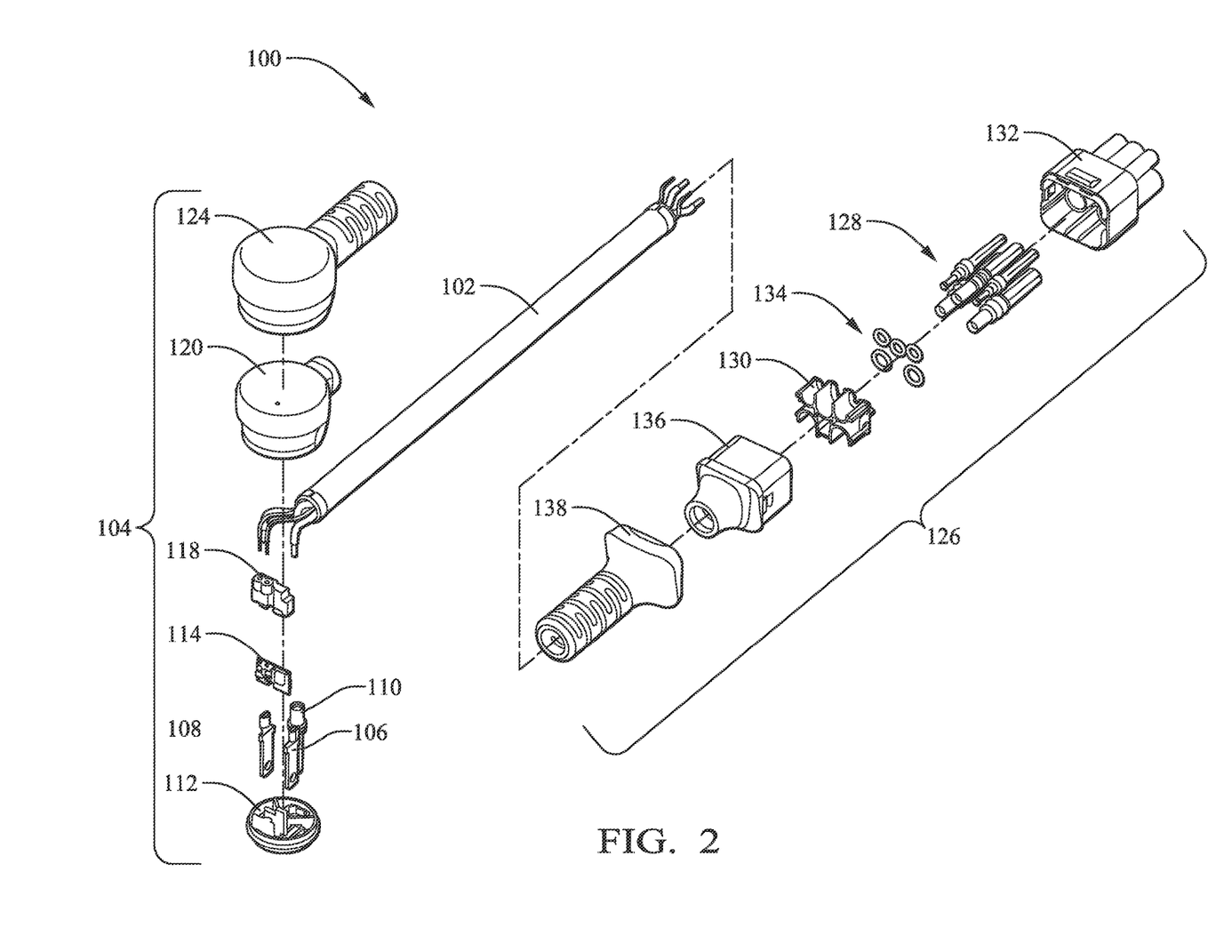
FIG. 2 shows an exploded view of an EVSE power supply cord conforming to NEMA 5-15 standards according to some embodiments.

FIGS. 1 and 2 show an example of an EVSE power supply cord, conforming to NEMA 5-15 standards, hereinafter referred to as the power cord 100. The power cord 100 includes a five-wire cable 102 having power, neutral, and ground wires and two signal wires. The power cord 100 has a plug 104 on one end conforming with the NEMA 5-15P standard with power, neutral and ground terminals 106, 108, 110 connected to the power, neutral, and ground wires in the cable 102. The power, neutral and ground terminals 106, 108, 110 are held within a plug faceplate 112 to properly space and align the terminals 106, 108, 110 in the plug 104.

Figure 3:
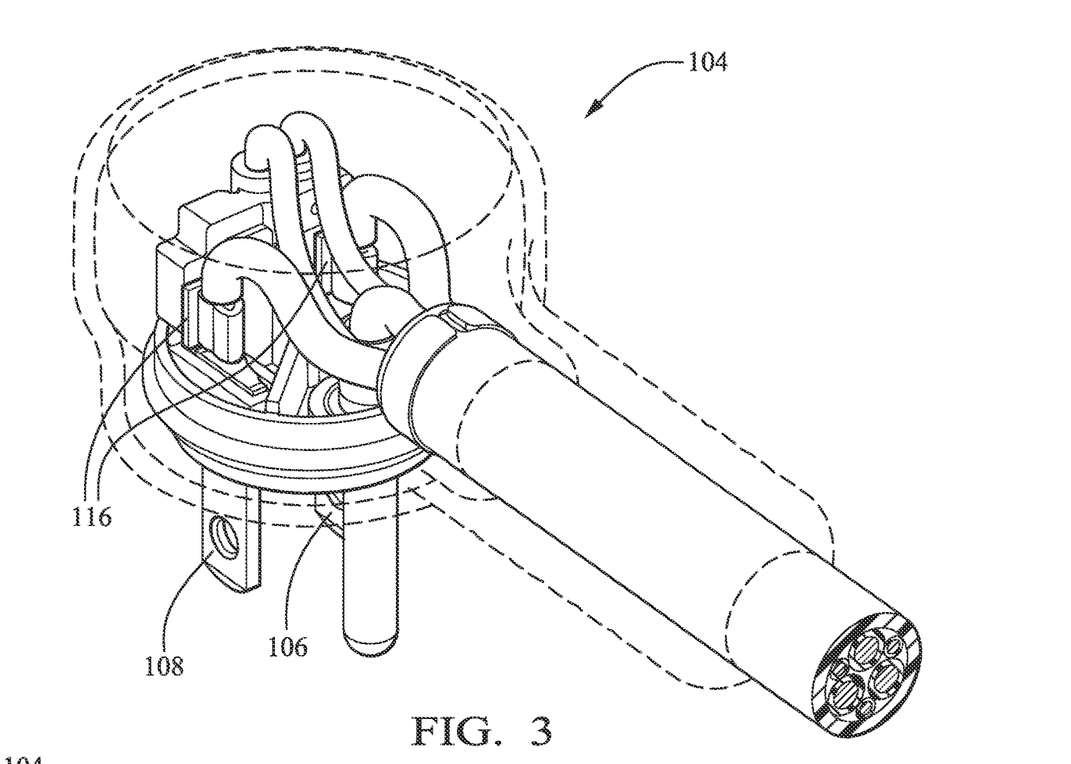
FIG. 3 shows a semitransparent view of the NEMA 5-15 plug of the EVSE power supply cord of FIG. 2 according to some embodiments.

The plug faceplate 112 also retains a printed circuit board assembly (PCBA) 114 containing temperature sensors 116, such as thermistors. As shown in FIG. 3, there are two temperature sensors 116, each located about 0.8 millimeters from the power or neutral terminals 106, 108. The PCBA 114 is connected to the two signal wires of the cable 102 and is encapsulated within a protective polymeric covering 118.

The plug 104 also includes a molded inner plug 120 that is formed of a thermoplastic material, such as polybutylene terephthalate. The components of the plug 104 are placed in a mold (not shown) and the thermoplastic material is injected into the mold, thereby forming the inner plug 120 and encapsulating the interface between the terminals 106, 108, 110 and wires of the cable 102, the inside of the plug faceplate 112, the encapsulated PCBA 114, 118, and the signal wires. The protective covering 118 on the PCBA 114 provides thermal protection for the PCBA 114 during the injection molding process, thereby inhibiting reflow of solder connecting electronic components in the PCBA 114.

Figure 4:
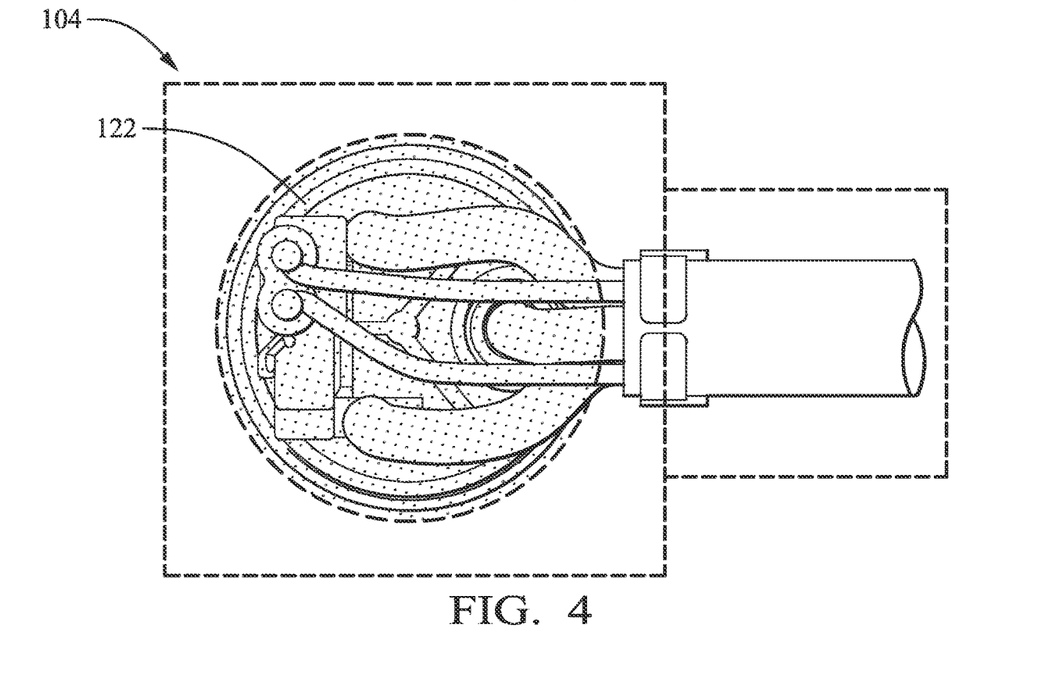
FIG. 4 shows a top view of the NEMA 5-15 plug of FIG. 3 according to some embodiments.

Prior to forming the inner plug 120, an in-mold bonding adhesive 122, such as one produced by Lord Corporation of Cary, North Carolina, USA (or equivalent), is applied to portions of the components of the plug 104 as shown in FIG. 4. The in-mold bonding adhesive 122 enhances the bonding of the thermoplastic material of the inner plug 120 with the metal and plastic components of the plug 104. This enhanced bonding improves resistance to fluid intrusion into the plug 104 which may cause corrosion or other damage to the plug components.

The plug 104 further includes a molded outer plug 124 that is formed of a thermoplastic elastomer material over the inner plug 120 and a portion of the cable 102, thereby providing strain relief for the cable 102.

The power cord 100 also has a socket 126 on the end of the cable 102 opposite the plug 104 that is configured to connect the power, neutral, ground, and signal wires to the EVSE. The socket 126 includes socket terminals 128 connected to the power, neutral, ground, and signal wires. The socket terminals 128 are held in a terminal cartridge 130 that is placed within a socket connector housing 132 having cavities configured to receive the socket terminals 128. O-rings 134 are placed between the socket terminals 128 and the terminal cartridge 130 to inhibit fluid intrusion into the socket 126. The socket 126 also includes an inner socket member 136 that is formed of a thermoplastic material, such as polybutylene terephthalate. The components of the socket 126 are placed in a mold (not shown) and the thermoplastic material is inserted into the mold, thereby forming the inner socket member 136 and thereby encapsulating the terminal cartridge 130, O-rings 134, inner socket member 136, wires, and the inside of the socket connector housing 132.

The socket 126 further includes an outer socket member 138 formed of a thermoplastic elastomer material over the inner socket member 136 and a portion of the cable 102, thereby providing strain relief for the cable 102.

Figure 5A:
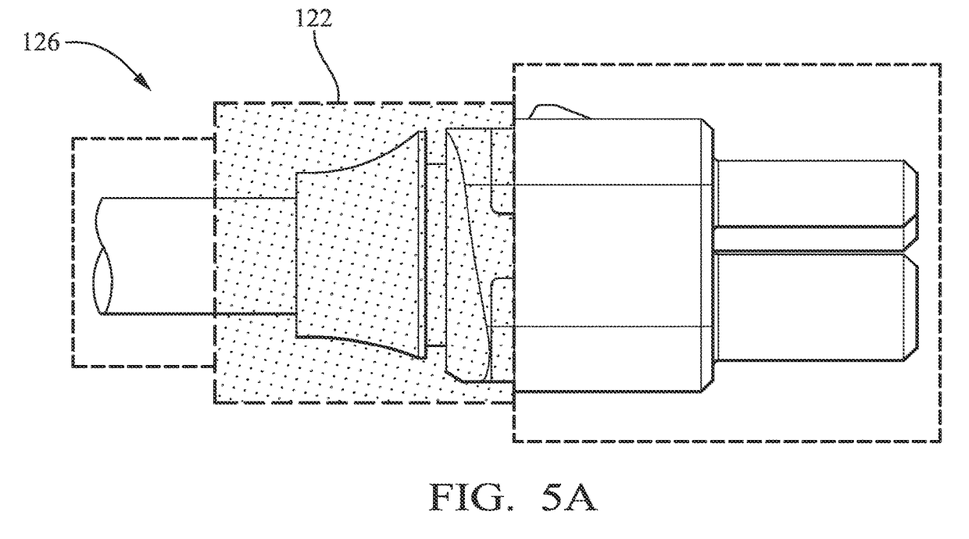
FIGS. 5A and 5B shows top and side views of an ESVE connector according to some embodiments.
Figure 5B:
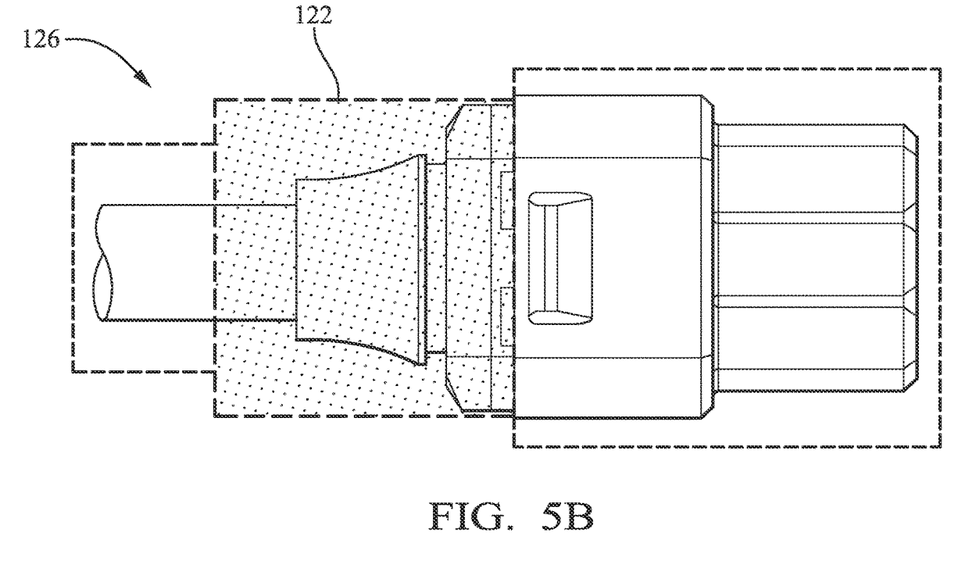
Figure 6:
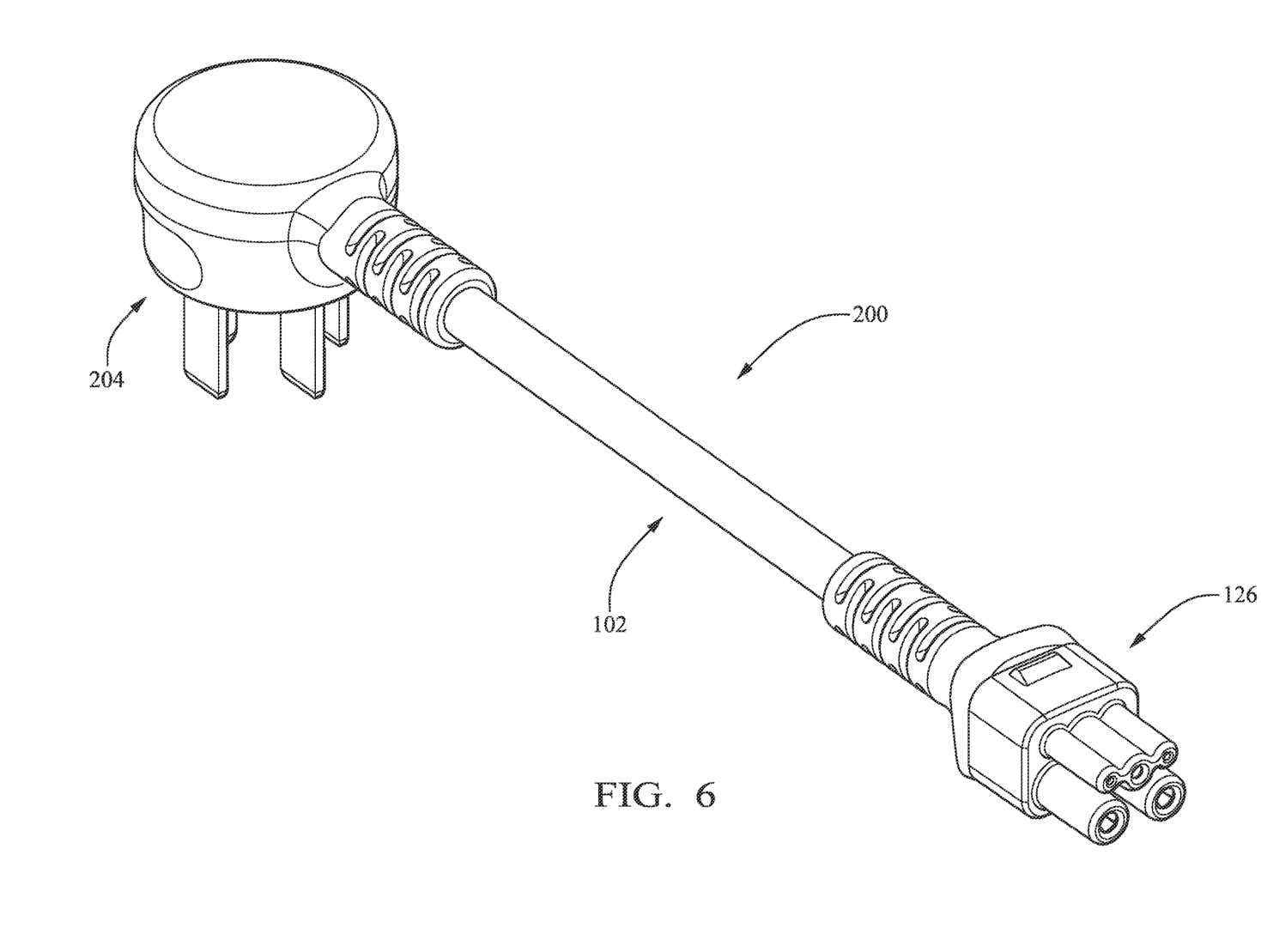
FIG. 6 shows a perspective view of another EVSE power supply cord according to some embodiments.
Figure 7:
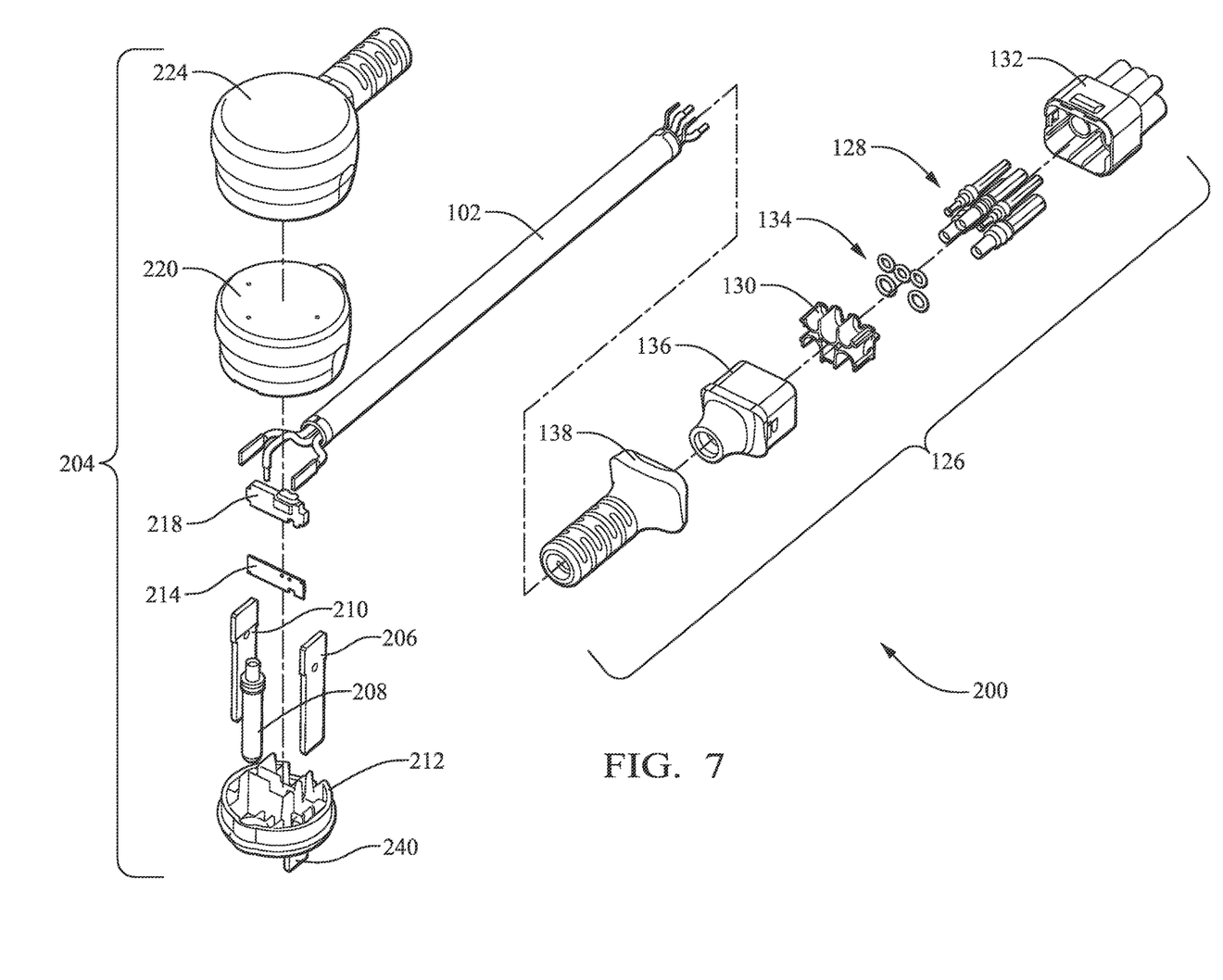
FIG. 7 shows an exploded view of an EVSE power supply cord conforming to NEMA 14-50 standards according to some embodiments.
Figure 8:
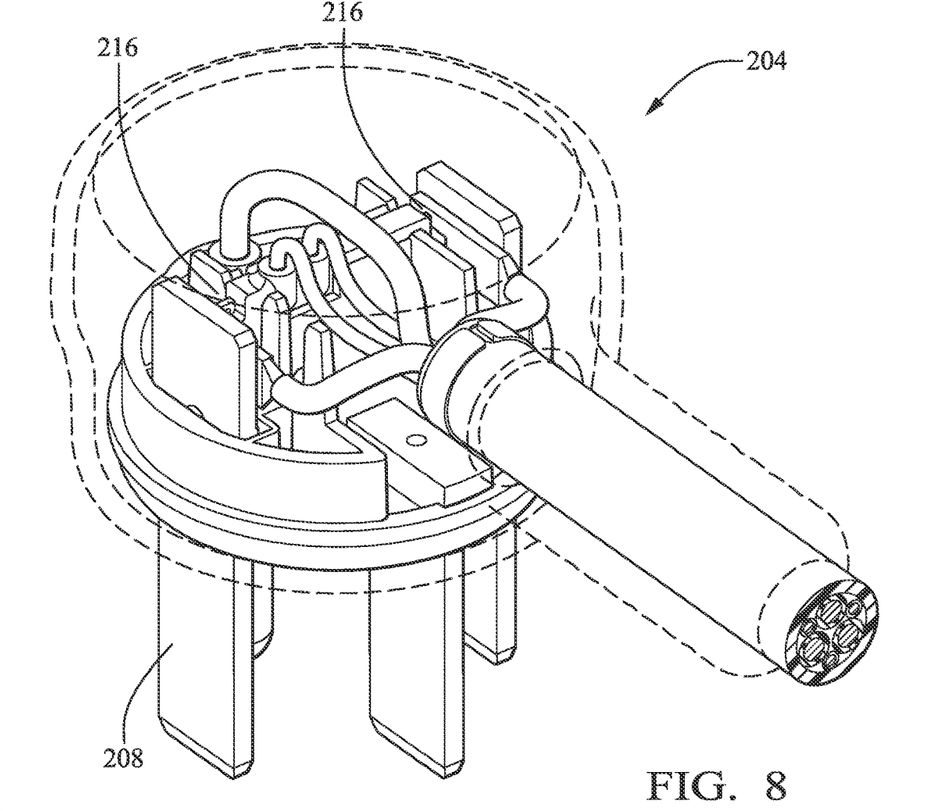
FIG. 8 shows a semitransparent view of the NEMA 14-50 plug of the EVSE power supply cord of FIG. 7 according to some embodiments.
Figure 9:
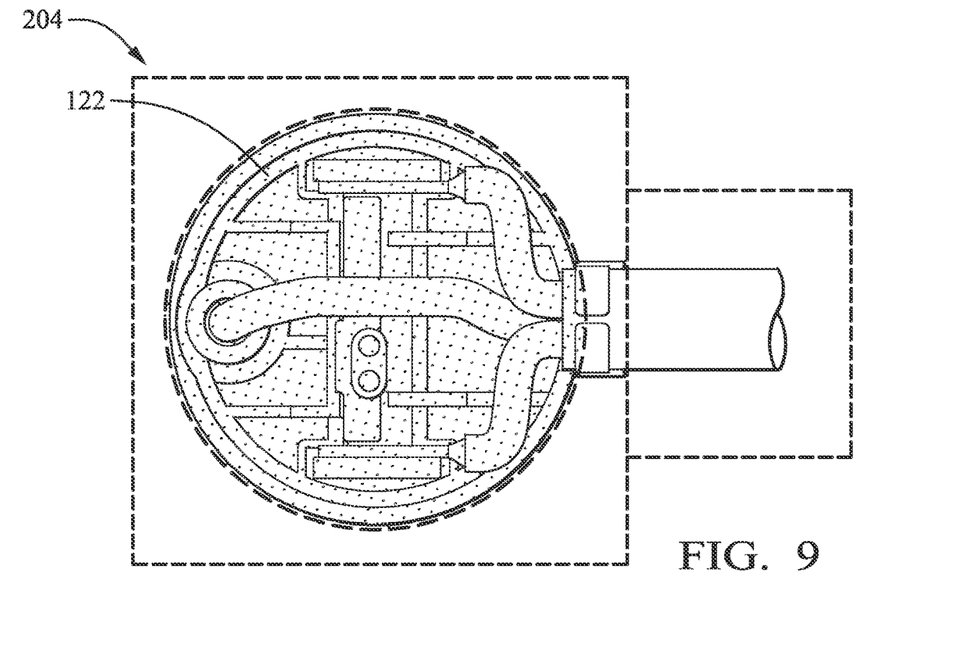
FIG. 9 shows a top view of the NEMA 14-50 plug of FIG. 8 according to some embodiments.

Prior to forming the outer socket member 138, the in-mold bonding adhesive 122 is also applied to outer portions of inner socket member 136 as shown in FIGS. 5A and 5B. The in-mold bonding adhesive 122 enhances the bonding of the thermoplastic material of the inner socket member 136 with the thermoelastic material of the outer socket member 138. This enhanced bonding improves resistance to fluid intrusion into the socket 126 which may cause corrosion or other damage to the socket terminals 128 or wires.

FIGS. 6-9 show another example of an EVSE power supply cord 200, this one conforming to NEMA 14-50 standards. This EVSE power supply cord differs from the power cord presented above only in substitution of a NEMA 14-50 plug 204 in place of the NEMA 5-15 plug 104. The other structural details, including the cable 102, socket 126, and the use of in-mold adhesives 122 remain the same.

The EVSE power supply cord presented herein provides enhanced resistance to fluid intrusion in the plug and socket that could damage terminals, wires, or other components in the plug or socket. This enhances resistance to fluid intrusion is at least partially due to the use of the in-mold bonding adhesive to provide a more robust bond between the plug and socket components, thereby sealing potential leak paths into or through the plug and socket.

While the illustrated examples contained herein show an EVSE power supply cord that conforms to either NEMA 5-15 or NEMA 14-50 technical standards used primarily in North America, other embodiments may be envisioned where the power and ground pins of the plug conform to other standards used in different parts of the world, such as Europlug CCE 7/16, British Standard (BS) 1363, Australian/ New Zealand Standard AS/NZS 3112, or Chinese PPCS-CCC technical standards.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

LISTING OF REFERENCE NUMBERS 100 5-15 Power cord
102 Cable
104 5-15 Plug
106 Power terminal
108 Neutral terminal
110 Ground terminal
112 Plug faceplate
114 PCBA
116 Temperature sensor
118 Covering
120 Inner plug
122 In-mold bonding adhesive
124 Outer plug
126 Socket
128 Socket terminals
130 Terminal cartridge
132 Socket connector housing
134 O-rings
136 Inner socket member
138 Outer socket member
200 14-50 Power cord
204 14-50 Plug
206 Power terminal
208 Neutral terminal
210 Ground terminal
212 Plug faceplate
214 PCBA
216 Temperature sensor
218 Covering
220 Inner plug
224 Outer plug
240 Dummy terminal

The invention claimed is:

1. An electrical power supply cord, comprising:
a wire cable comprising a plurality of separate conductors;
a plurality of plug terminals connected to the plurality of separate conductors;
a molded inner plug encasing a connection between the plurality of plug terminals and the plurality of separate conductors;
in-mold bonding adhesive disposed intermediate the connection between the plurality of plug terminals and the plurality of separate conductors and the molded inner plug; and
a molded outer plug encasing the molded inner plug and a portion of the wire cable.

2. The electrical power supply cord in accordance with claim 1, wherein the molded inner plug is formed of an injection moldable polymer.

3. The electrical power supply cord in accordance with claim 2, wherein the molded inner plug is formed of polybutylene terephthalate.

4. The electrical power supply cord in accordance with claim 1, wherein the molded outer plug is formed of a thermoplastic elastomer.

5. The electrical power supply cord in accordance with claim 1, wherein the molded outer plug is shaped to provide strain relief between the molded inner plug and the wire cable.

6. An electrical power supply cord, comprising:
   a wire cable comprising a plurality of separate conductors;
   a plurality of plug terminals connected to the plurality of separate conductors;
   a molded inner plug encasing a connection between the plurality of plug terminals and the plurality of separate conductors;
   in-mold bonding adhesive disposed intermediate the connection between the plurality of plug terminals and the plurality of separate conductors and the molded inner plug;
   a plurality of socket terminals connected to the plurality of separate conductors;
   a molded inner socket encasing a connection between the plurality of socket terminals and the plurality of separate conductors;
   a molded outer socket encasing the molded inner socket and a portion of the wire cable; and
   in-mold bonding adhesive disposed intermediate the molded inner socket and the molded outer socket.

7. The electrical power supply cord in accordance with claim 6, wherein the molded inner socket is formed of an injection moldable polymer.

8. The electrical power supply cord in accordance with claim 7, wherein the molded inner socket is formed of polybutylene terephthalate.

9. The electrical power supply cord in accordance with claim 6, wherein the molded outer socket is formed of a thermoplastic elastomer.

10. The electrical power supply cord in accordance with claim 6, wherein the molded outer socket is shaped to provide strain relief between the molded inner socket and the wire cable.

11. A method of assembling an electrical power supply cord, comprising:
    connecting a plurality of plug terminals, a plurality of separate conductors in a wire cable;
    depositing an in-mold bonding adhesive on the plurality of plug terminals and the plurality of separate conductors;
    forming a molded inner plug encasing a connection between the plurality of plug terminals and the plurality of separate conductors using an injection molding process;
    connecting a plurality of socket terminals to the plurality of separate conductors;
    forming a molded inner socket encasing a connection between the plurality of socket terminals and the plurality of separate conductors using an injection molding process;
    deposing the in-mold bonding adhesive on the molded inner socket; and
    forming a molded outer socket encasing the molded inner socket and a portion of the wire cable using an injection molding process, such that the in-mold bonding adhesive is deposited intermediate the molded inner socket and the molded outer socket.

12. The method in accordance with claim 11, wherein the molded inner plug is formed of polybutylene terephthalate.

13. The method in accordance with claim 11, further comprising forming a molded outer plug encasing the molded inner plug and a portion of the wire cable using the injection molding process.

14. The method in accordance with claim 13, wherein the molded outer plug is formed of a thermoplastic elastomer.

15. The method in accordance with claim 13, further comprising shaping the molded outer plug to provide strain relief between the molded inner plug and the wire cable.

16. The method in accordance with claim 11, wherein the molded inner socket is formed of polybutylene terephthalate.

17. The method in accordance with claim 11, wherein the molded outer socket is formed of a thermoplastic elastomer.

18. The method in accordance with claim 11, further comprising shaping the molded outer socket to provide strain relief between the molded inner socket and the wire cable.

\* \* \* \* \*